United States Patent
Rasanen et al.

(10) Patent No.: US 10,986,140 B2
(45) Date of Patent: *Apr. 20, 2021

(54) SETTING MODE OF COMMUNICATION

(71) Applicant: Conversant Wireless Licensing S.a r.l., Luxembourg (LU)

(72) Inventors: Juha Rasanen, Espoo (FI); Juha Back, Helsinki (FI); Juha Kallio, Helsinki (FI); Seppo Kallio, Tampere (FI); Juha Lindfors, Vantaa (FI); Juha Oravainen, Helsinki (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,025

(22) Filed: Apr. 20, 2020

(65) Prior Publication Data

US 2020/0252441 A1    Aug. 6, 2020

Related U.S. Application Data

(63) Continuation of application No. 16/296,719, filed on Mar. 8, 2019, which is a continuation of application
(Continued)

(30) Foreign Application Priority Data

Oct. 10, 2001    (GB) ..................................... 01243237

(51) Int. Cl.
*H04M 3/00*    (2006.01)
*H04L 29/06*    (2006.01)
(Continued)

(52) U.S. Cl.
CPC ......... *H04L 65/1066* (2013.01); *H04W 28/18* (2013.01); *H04W 76/20* (2018.02);
(Continued)

(58) Field of Classification Search
CPC ..... H04W 8/245; H04W 48/18; H04W 88/06; H04W 48/16; H04W 80/04; H04W 88/04;
(Continued)

(56) References Cited

U.S. PATENT DOCUMENTS 4,901,345 A * 2/1990 Imagawa ............ H04M 1/2155
379/100.15
6,011,978 A * 1/2000 Ault ...................... H04W 48/18
455/552.1

(Continued)

*Primary Examiner* — Danh C Le
(74) *Attorney, Agent, or Firm* — Conversant Wireless Licensing

(57) ABSTRACT

A method in a communication system is disclosed. In the method a procedure for setting up a communication link between a first user equipment and a second user equipment via a communications network is initiated. Information regarding at least two modes of communication that can be used for communication via the communication link is signalled between the first and second user equipment. An indicator regarding a mode to be used for the communication is also signalled between the first user equipment and the second user equipment. After the signalling steps, a procedure for setting the mode of communication in accordance with the indicator is initiated in at least in one of the user equipment. According to an alternative embodiment signalling for reserving a possibility for at least tow different communication modes occurs between elements of the communication system.

8 Claims, 7 Drawing Sheets

Related U.S. Application Data

No. 15/850,292, filed on Dec. 21, 2017, now Pat. No. 10,270,813, which is a continuation of application No. 14/094,780, filed on Dec. 2, 2013, now Pat. No. 9,882,941, which is a continuation of application No. 11/498,711, filed on Aug. 4, 2006, now Pat. No. 8,615,223, which is a continuation of application No. 10/268,073, filed on Oct. 10, 2002, now Pat. No. 7,181,202.

(51) Int. Cl.
    *H04W 76/20* (2018.01)
    *H04W 28/18* (2009.01)
    *H04M 1/725* (2021.01)
    *H04W 8/24* (2009.01)

(52) U.S. Cl.
    CPC .... *H04M 1/72519* (2013.01); *H04M 1/72522* (2013.01); *H04W 8/245* (2013.01)

(58) Field of Classification Search
    CPC .......... H04M 1/72525; H04M 1/72522; H04B 1/406
    USPC ............... 455/456.5, 418, 552.1; 370/385
    See application file for complete search history.

(56) References Cited

U.S. PATENT DOCUMENTS

| | | | |
|---|---|---|---|
| 6,285,407 B1* | 9/2001 | Yasuki | H04N 7/088 348/460 |
| 6,285,891 B1* | 9/2001 | Hoshino | H04M 1/72569 455/550.1 |
| 6,915,119 B1* | 7/2005 | Konishi | H04M 1/72555 455/127.1 |
| 2001/0012347 A1* | 8/2001 | Fujino | H04M 1/575 379/142.06 |
| 2001/0012761 A1* | 8/2001 | Mitama | H04B 1/3833 455/41.2 |
| 2002/0004812 A1* | 1/2002 | Motoyama | H04L 51/30 709/201 |
| 2002/0006785 A1* | 1/2002 | Ohtsuki | H04M 1/0214 455/414.1 |
| 2002/0025784 A1* | 2/2002 | Horiguchi | H04B 1/401 455/74 |

* cited by examiner

SETTING MODE OF COMMUNICATION

CROSS-REFERENCE AND RELATED APPLICATIONS

This patent application is a continuation application of U.S. patent application Ser. No. 16/296,719 filed Mar. 8, 2019, which is a continuation of U.S. Pat. No. 10,270,813 issued on Apr. 23, 2010 (U.S. patent application Ser. No. 15/850,292 filed Dec. 21, 2017), which is a continuation of U.S. Pat. No. 9,882,941 issued on Jan. 30, 2018 (U.S. patent application Ser. No. 14/094,780 filed on Dec. 2, 2013), which is a continuation of U.S. Pat. No. 8,615,223 issued on Dec. 24, 2013 (U.S. patent application Ser. No. 11/498,711 filed on Aug. 4, 2006), which is a continuation of U.S. Pat. No. 7,181,202 issued on Feb. 20, 2007 (U.S. patent application Ser. No. 10/268,073 filed on Oct. 10, 2002) which claims benefit of United Kingdom Application No. 0124323.7 filed Oct. 10, 2001. The subject matter of the previously filed application is hereby incorporated by reference.

BACKGROUND

The disclosure relates to communication systems, and in particular to setting the mode of communication between two nodes.

A communication system is arranged for provision of communication connections between two or more entities such as user terminal equipment and/or other nodes associated with the system. The communication may comprise, for example, communication of voice, electronic mail (email) and text messages, multimedia and so on. A communication system may provide communication over a fixed line or wireless interface for user terminals or other nodes. An example of systems carrying wireless communication is the public land mobile network (PLMN). An example of the fixed line networks is the public switched telephone network (PSTN).

A communication system typically operates in accordance with a given standard or specification which sets out what the various elements of the system are permitted to do and how that should be achieved. For example, the standard or specification may define if the user, or more precisely, user equipment or terminal is provided with a circuit switched (CS) service or a packet switched (PS) service or both. Communication protocols and/or parameters which shall be used for the connection are also typically defined. For example, the manner how communication shall be implemented between the user equipment and the elements of the communication network is typically based on a predefined communication protocol. In other words, a specific set of "rules" on which the communication can be based on needs to be defined to enable communication by means of the communication system.

Examples of the different standards and/or specifications for wireless communication include, without limiting to these, specifications such as GSM (Global System for Mobile communications), AMPS (American Mobile Phone System), DAMPS (Digital AMPS), various GSM based systems such as the GPRS (General Packet Radio Service). The so called $3^{rd}$ generation (3G) standards include systems such as the WCDMA (Wideband Code Division Multiple Access) based UMTS (Multiple Access in Universal Mobile Telecommunications System), IMT 2000 (International Mobile Telecommunications system 2000), i-Phone and so on.

In a typical wireless cellular communication system a base station of a radio access network serves user equipment such as mobile stations or similar terminal apparatus via a wireless interface. Each of the cells of the cellular system can be served by an appropriate transceiver apparatus, typically, but not always, referred to as a base station (BS). The base station may be connected to and controlled by a controller entity. For example, in the GSM radio network a base station is connected to and controlled by a node referred to as a base station controller (BSC). The BSC node may in turn be connected to and controlled by a mobile switching center (MSC), a serving GPRS support node (SGSN) or similar facility. It shall be appreciated that the controller entities may be provided by means of appropriate server entities. For example, functions of a MSC may be provided by a MSC server (MSS).

The communication link between a user equipment and the network, i.e. the so called user-to-network leg is typically controlled by at least one controller entity. The leg may be controlled e.g. by means of a home or a visited MSC or a MSS media gateway (MGW). When setting up a communication path between two user equipment via the communication network the communication mode of the legs at both ends of the path are set up and synchronised so that a desired mode of communication can be provided for the users. For example, the calling user may wish to have a speech connection or a video or other multimedia connection with the called user, and the connection is then set up accordingly.

The prior art also suggest a fallback behaviour by means of which a call can be returned to speech mode in case an attempt to establish a multimedia call fails. By means of this feature a calling user does not need to know whether the called party supports or wants to receive a video or other multimedia call, because in this case the call would automatically fall back to a speech call. If the fallback feature is not provided, the call set-up would then simply fail.

The users may also wish to be able to change e.g. from the speech mode to the multimedia mode during an ongoing call. This is enabled e.g. by means of the so called SWAP scheme wherein users can start the call either with speech or with multimedia, and then swap from speech to multimedia and vice versa during the call. More particularly, e.g. in the SWAP scheme the users can swap from speech to multimedia and vice versa by initiating the change at both end legs of the connection. The swap between modes needs to be accomplished locally at each of the end legs between the respective mobile stations and the visited mobile switching centre entities. This is so since in the proposed solution the fixed network leg between the wireless legs may offer a substantially constant 64 kbit/s transmission throughout a call, that is the mode of the fixed leg is not changed even if the mode of the legs needs to be changed.

The inventors have found that the change of the modes may not operate satisfactorily in the prior art communication systems, and that the users might wish to obtain an improved solution for the change of modes. For example, if the call is done within a 3GPP (third generation partnership project) Release 4 split core network architecture i.e. in a system involving elements such as a MSC Servers (MSS) and Media Gateway (MGW) network elements, the swap procedure requires an in-call bearer modification procedure. This procedure is required to be used in order to be able to dynamically modify characteristics of a user plane (i.e. the Nb interface) connection (codec) between the MGWs associated with the connection.

The inventors have found that a multimedia call cannot be started whit a speech-only mode provided with the current ISUP (ISDN User part) signalling and BICC (Bearer Independent Call Control), and that the current ISUP and BICC do not support switching ("swapping") between speech and multimedia modes. Consequently, the synchronisation of the possible swaps at both end legs of the connection is left to the users. The users, for example, need to agree verbally on the swap. Both users need then activate manually an appropriate radio channel modification procedure at their terminals or even setup a new call in the desired mode.

SUMMARY

Embodiments of the present invention aim to address one or several of the above problems.

According to one aspect, there is provided a method in a communication system, the method comprising:

initiation of a procedure for setting up a communication link between a first user equipment and a second user equipment via a communications network;

signalling between the first user equipment and the second user equipment information regarding at least two modes of communication that can be used for communication via the communication link;

signalling between the first user equipment and the second user equipment an indicator regarding a mode to be used for the communication; and initiating in at least in one of the user equipment a procedure for setting the mode of communication in accordance with the indicator.

According to another aspect, there is provided a communication system comprising network apparatus for provision of a communication media between a first user equipment and a second user equipment, the communication media consisting of a first leg between the first user equipment and the network apparatus, a second leg between the second user equipment and the network apparatus, and an intermediate portion between the first and second legs, wherein the mode of communication in at least one of said legs can be controlled by the associated user equipment based on instructions signalled to said user equipment from the user equipment associated with the other one of the legs.

According to another aspect, there is provided a user equipment for communication via a communication system, comprising means for generating and interpreting messages that include information regarding possible modes of communication available for the user equipment and means for controlling the mode that shall be used for communication in accordance with information included in such a message.

According to another aspect, there is provided a method in a communication system, comprising:

initiating a procedure for setting up a communication media between at least two user equipment;

signalling from or to a network element of the communication system information regarding at least two modes of communication, one of the modes being for use in the beginning of the communication and the at least one other mode being reserved for possible use during the communication via the communication media;

signalling from or to said network element an indicator regarding a mode selected among said at least two modes; and setting the mode of communication in accordance with the indicator.

According to another aspect, there is provided a communication system, said system comprising means for providing a communication media between at least two user equipment, and a network element for controlling a communication leg of said communication media, said leg being provided between a user equipment and the communication system, the network element being adapted for sending and/or receiving information regarding at least two modes of communication, one of the modes being for use in the beginning of communication via said communication media and the at least one other mode being reserved for possible use during the communication via the communication media, and also for sending and/or receiving an indicator regarding a mode selected among said at least two modes, and for setting the mode of communication in said leg in accordance with the indicator.

According to another aspect, there is provided a network element for a communication system, the element being arranged to control a communication leg provided between a user equipment and the communication system, for sending and/or receiving information regarding at least two modes of communication, one of the modes being for use in the beginning of communication via said communication leg and the at least one other mode being reserved for possible use during the communication via the communication leg, for sending and/or receiving an indicator regarding a mode selected among said at least two modes, and for setting the mode of communication in said leg in accordance with the indicator.

The embodiments of the invention may provide a solution wherein a video or other multimedia call can be started in a less demanding i.e. a lower grade mode such as in the speech mode. The lower grade mode may be cheaper to use. A swap to multimedia can be made only when required. A return to the cheaper speech mode can be made when the multimedia mode is no longer required. The swap may be automatically synchronised and controlled without requiring any activation by the users.

BRIEF DESCRIPTION OF THE DRAWINGS

For better understanding of the disclosure, reference will now be made by way of example to the accompanying drawings in which:

FIG. 1 is a schematic presentation of a communication system wherein the embodiments of the present invention can be applied to;

DETAILED DESCRIPTION

Figure 1:
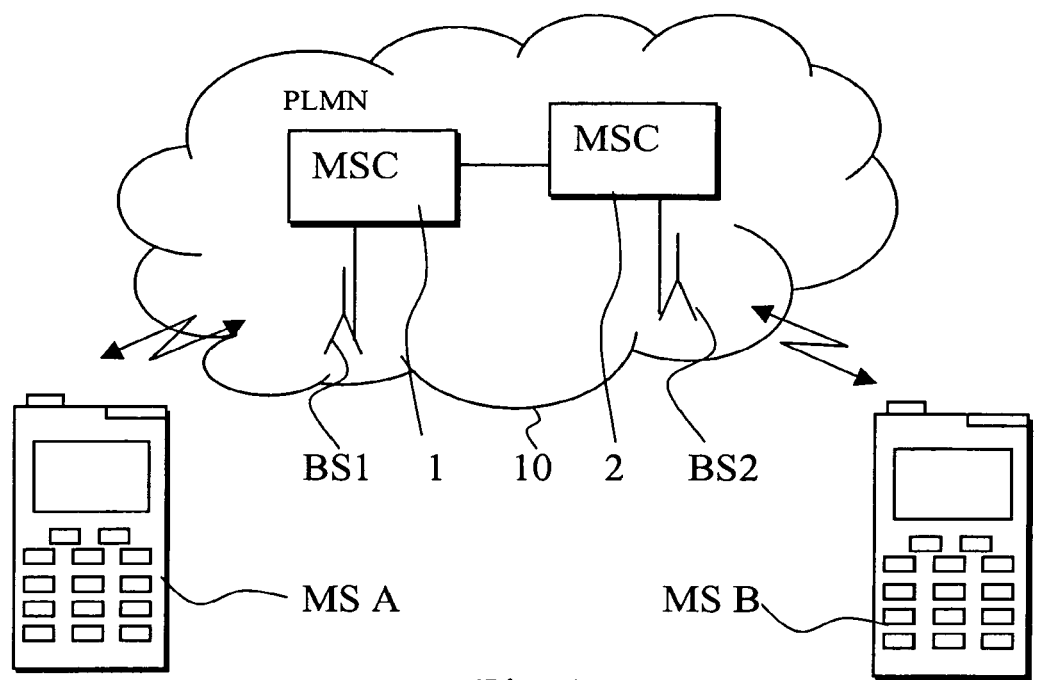

Reference is made to schematic FIG. 1 which shows a communication system wherein the embodiments may be employed. More particularly, FIG. 1 shows a circuit switched PLMN network 10 and two mobile user terminal equipment, i.e. mobile stations MS A and MS B. The operation of a typical PLMN system, such as those based on the GSM, and various elements thereof is known by the skilled person, and is thus not explained in any greater detail. It is sufficient to note that each of the mobile stations MS A and MS B may communicate over a wireless interface with a respective base station BS1, BS2 of the communication network 10. The communication link or media between mobile stations MS A and MS B consist of the two wireless interfaces and the intermediate communication media within the network 10.

Two controller entities, and more particularly two mobile switching centres MSC 1 and 2 are also shown. Each of the mobile switching centres (MSC) may comprise a home MSC or a visited MSC. The MSCs may be provided with any appropriate controller entity, such as a server or a more conventional switching entity. The controller entities 1 and 2 are for controlling the provision of the wireless communication links for the mobile stations MS A and MS B, respectively.

The herein described embodiments are implemented by means of the user terminal equipment MS A and MS B or the apparatus of the communication network. The following will describe these possibilities, starting from the solution wherein the change of the communication mode is initiated by means of communication between at least two user terminal equipment.

Figure 2:
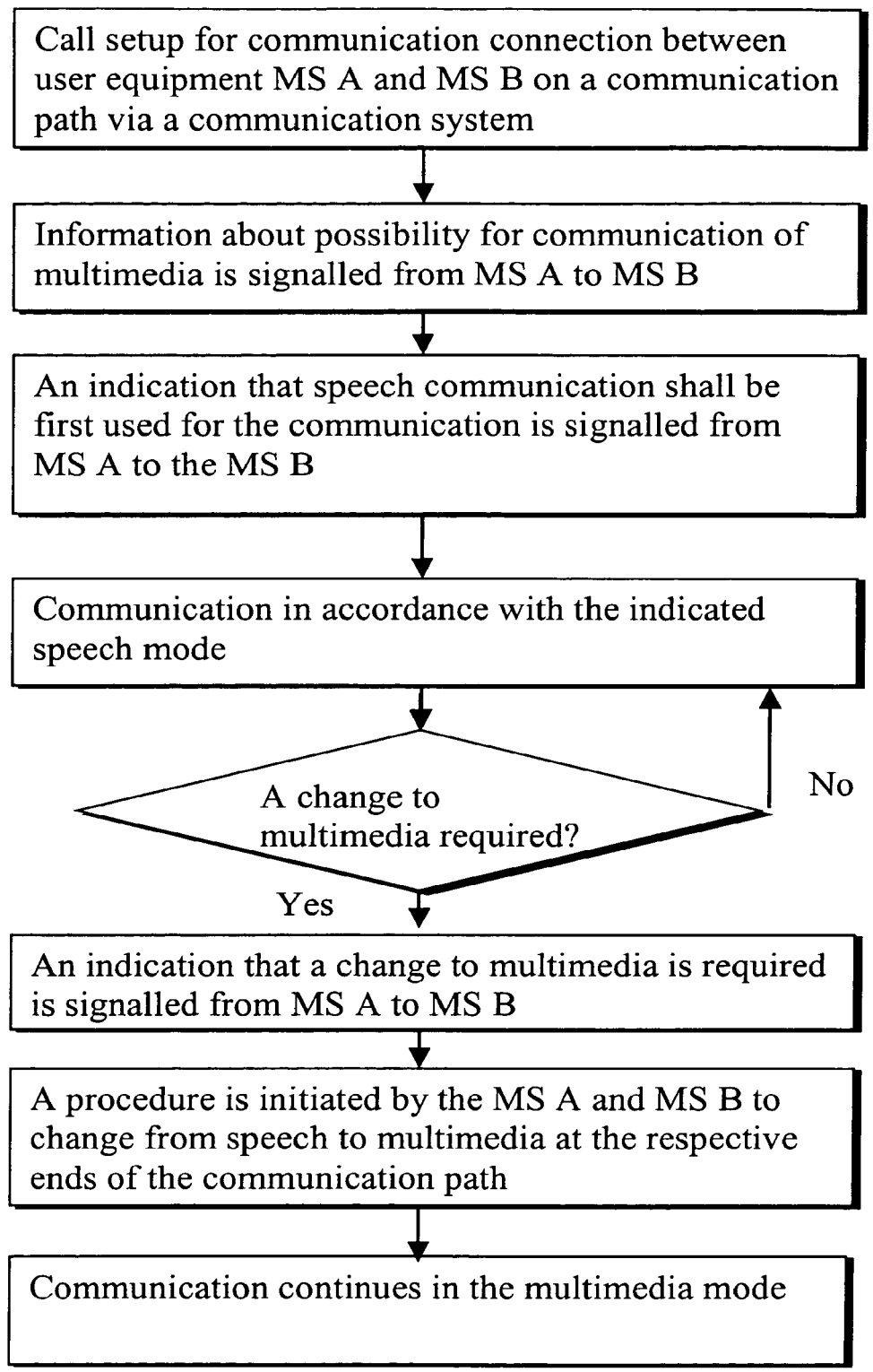
FIG. 2 is a flowchart illustrating operation in accordance with one embodiment.

A solution that is based on signalling between the user equipment will be described first generally with reference also to the flowchart of FIG. 2.

When a calling user equipment MS A wants the call to start e.g. in the speech mode, the terminal may reserve a possibility to swap later on to another mode. For example, the user may wish to reserve a possibility to change to a UDI/RDI (Unrestricted Digital Information/Restricted Digital Information) video/multimedia mode during an already established call.

The calling user terminal equipment MS A may accomplish this by sending two Bearer Capability Information Elements (BCIEs) in a SETUP message (e.g. a GMS/UMTS SETUP message). The BCIEs may comprise a 'Speech' BCIE and a 'UDI/RDI Multimedia' BCIE. The BCIEs are preferably in the order the user of the calling user equipment MS A wishes the call to proceed. For example, the GSM/UMTS SETUP messages are capable of carrying two BCIEs. Thus the provision of this feature will not necessarily require any major modifications of the already existing setup signalling mechanism.

The calling user equipment MS A may also send a "speech first" indication. The "speech first" indication is preferably transparent for the network 10. Instead, the indicator is intended to be used by the called user equipment MS B only. According to a possibility the known User-to-User Service (UUS) is used for the signalling of the indicator from the calling user equipment MS A to the called user equipment MS B. The User-to-User Service (UUS) is a standard feature that is already implemented in network elements of a modern communication system.

The indication can be e.g. a text command like "Speech", a flag or any other appropriate indicator that can be interpreted by the called party user equipment MS B. What is essential is that the called user equipment MS B can interpret the indicator to be able to determine the mode that shall be used for the communication. More precise examples of appropriate indicators, possibilities to signal the indicator and subsequent operation will be given later with references to the signalling flow charts of FIGS. 3 to 5.

After the called user equipment MS B has received the indicator, it may send an acknowledgement thereof and initiate a procedure for the setup of its end leg into the speech mode. The two user equipment may then communicate in the speech mode via the network.

As explained above, a possibility for a multimedia mode was reserved during the setup procedure. Should the users wish to change to the multimedia mode, the change can be initiated by signalling an appropriate indicator from one user equipment to another. This can be accomplished in the direction from the user equipment MS A to the user equipment MS B or vice versa. After the other one of the user equipment has received the indicator is activates a procedure for changing the mode from speech to multimedia at its leg. After both end legs have been modified, the communication continues in the multimedia mode. It may be required in some applications that the communication path between the end legs is also modified, although this is not the preferred option.

Figure 3:
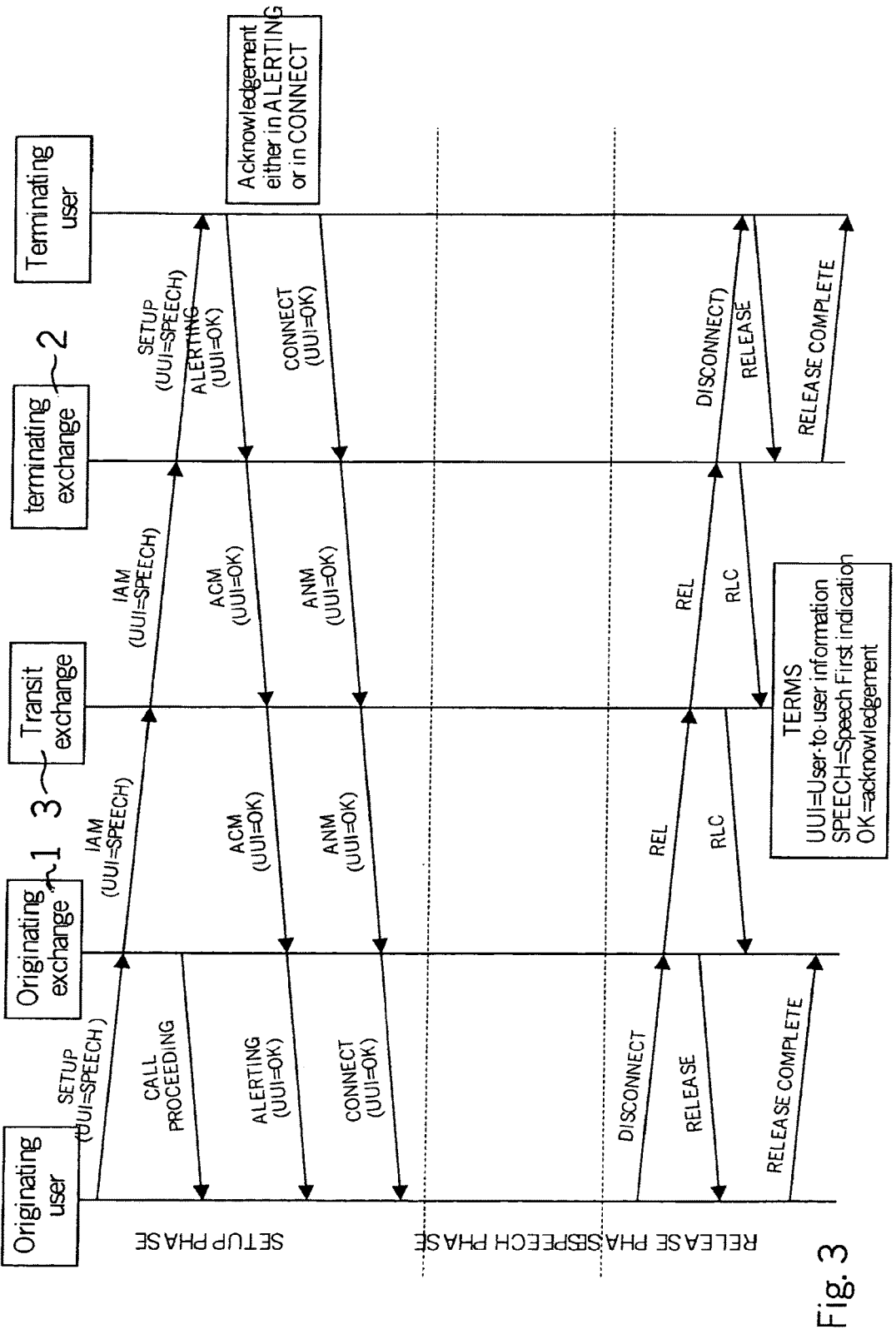
FIGS. 3 to 5 are signalling flowcharts for various embodiments.
Figure 4A:
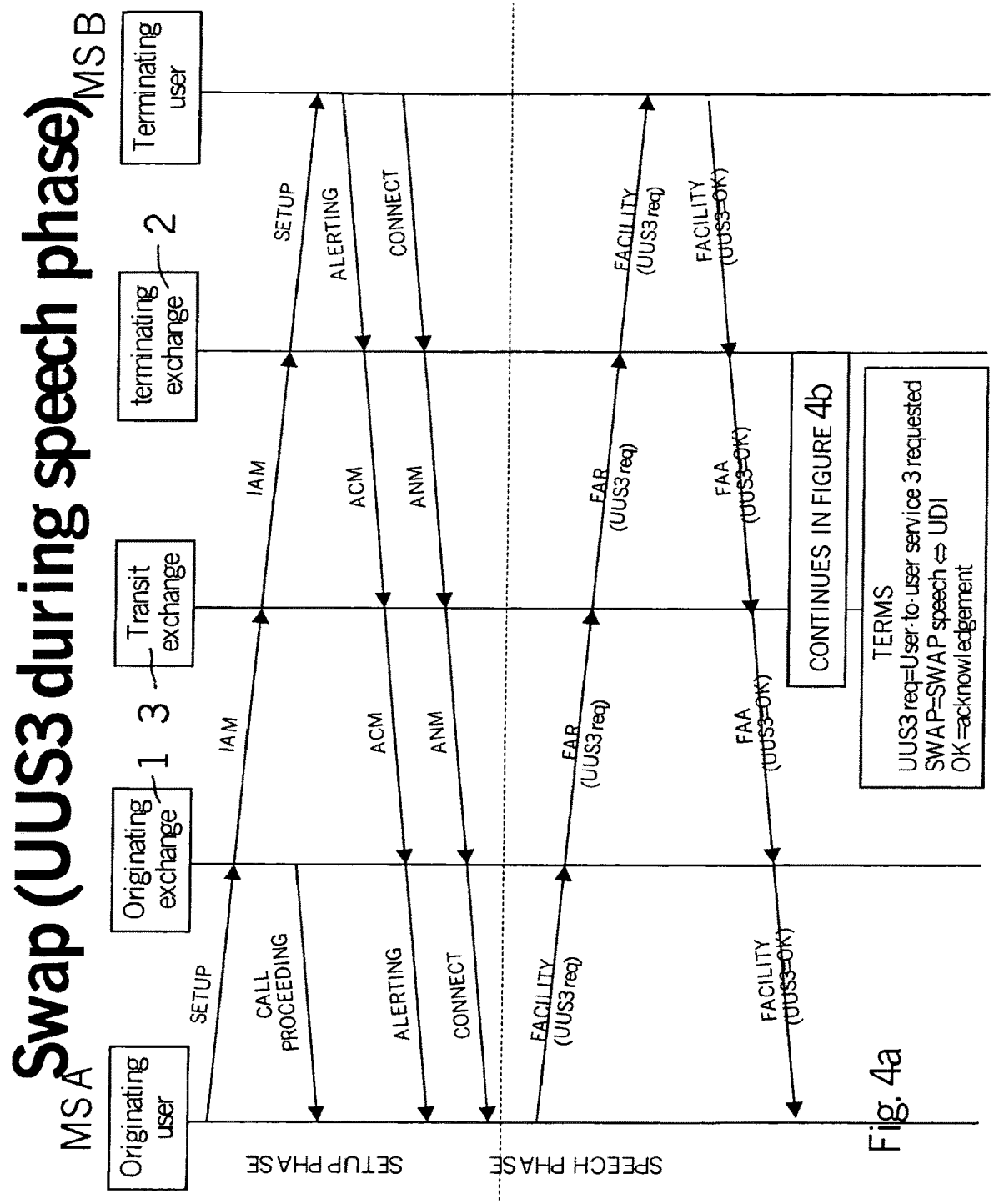
Figure 4B:
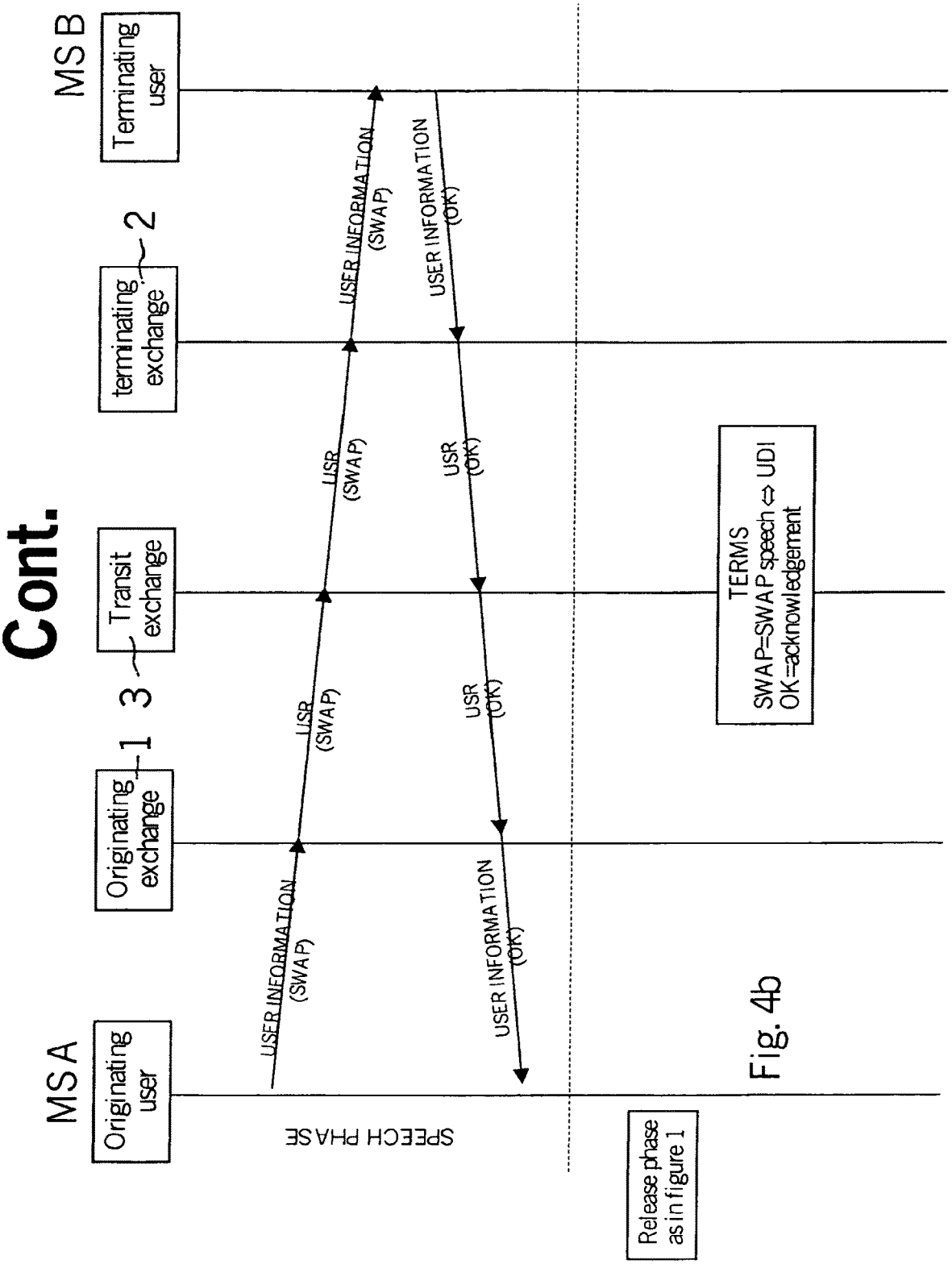
Figure 5:
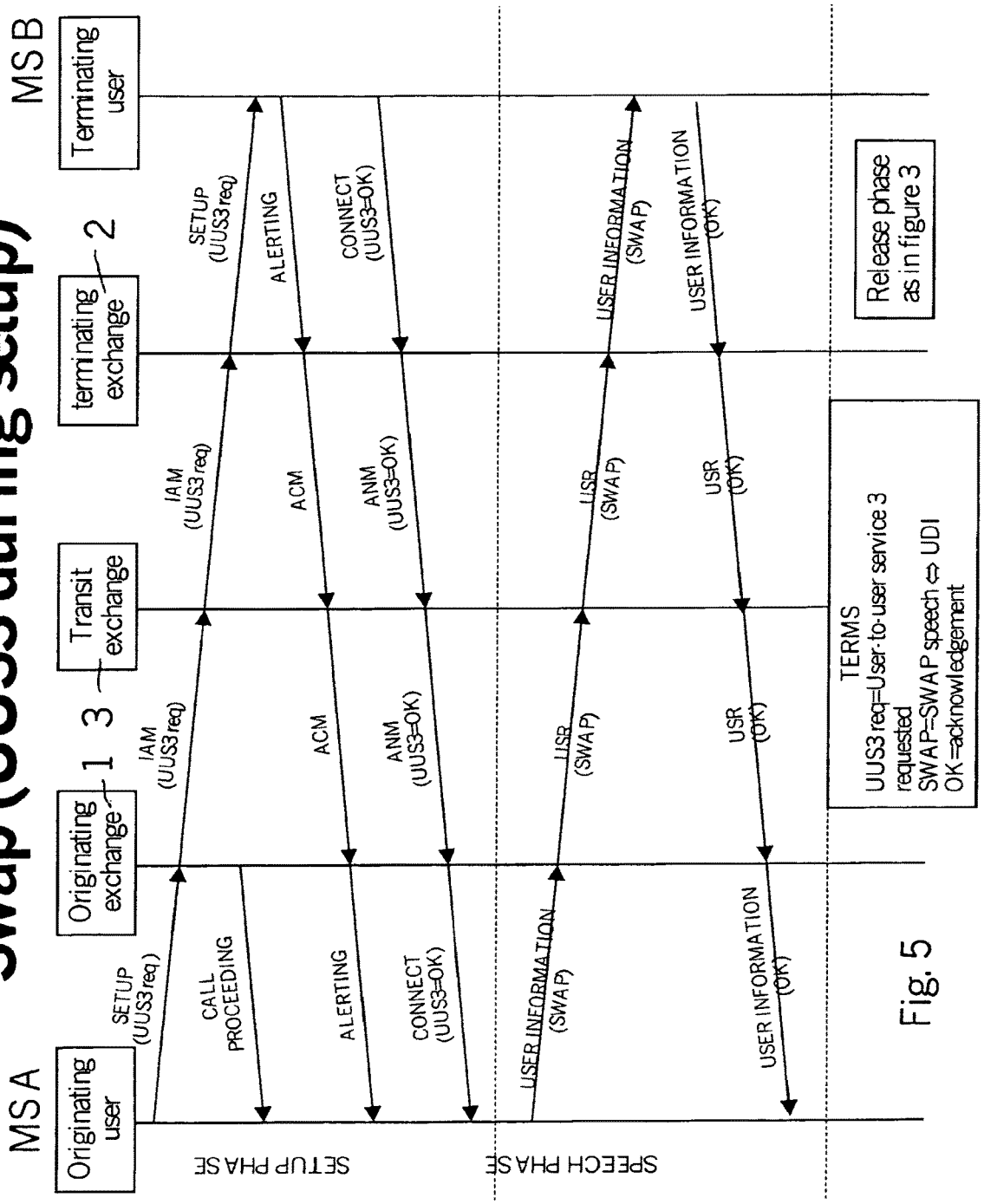

The following will give with reference to FIGS. 3 to 5 more detailed examples of the signalling of information between the two user equipment. In the example the MS A is assumed as being the originating user and the MS B is assumed as being the terminating user. The communication path via the network is shown to include three separate controller entities. These will be referred to as originating exchange 1, transit exchange 3, and terminating exchange 2.

According to a possibility shown in FIG. 3 the indication can be sent already in SETUP Initial Address Message (IAM) using the so called UUS service 1. The UUS service 1 refers to a user to user signalling service that can be used when signalling call setup messages.

The IAM is passed through the exchanges 1, 3 and 2. The called user equipment MS B then receives the SETUP (IAM) message containing the UDI/RDI request. The reception of a SETUP message as such is an existing feature of the ISUP and/or the GSM/UMTS, and will thus not be explained in any greater detail. After reception the MS B may send an acknowledgement in an appropriate message. For example, messages such as 'ALERTING', 'Address Complete Message' (ACM) or 'CONNECT Answer Message' (ANM) may be forwarded to the calling user equipment MS A.

The call is then set up as a speech call, as was indicated by the SETUP message. However, the connection in the intermediate network may use a UDI/RDI transmission without compression to facilitate an easier swap from speech mode to UDI/RDI Multimedia mode, should this be required.

According to a possibility, when the called terminal MS B receives a "speech" indication, it consequently responds to the SETUP IAM with two BCIEs, such as 'Speech' and 'Multimedia'. The BCIEs may be transported in this order so that the call will start with speech. The receiving user equipment MS B may also acknowledge receipt of the initial speech indication from the calling user equipment MS A (using e.g. the above mentioned UUS mechanism). Thus the called user equipment MS B may also reserve the possibility to swap the modes later, if required. The called user equipment MS B may also indicate by means of the $1^{st}$ BCIE which mode to use in the start of the call.

According to an alternative embodiment, the called user equipment MS B may respond to the setup messages with a "UDI/RDI first" (i.e. UDI/RDI Multimedia BCIE and a Speech BCIE in this order) and initiate a modification to speech (between itself and the serving network) later, e.g. immediately after the SETUP.

It is possible that the calling user equipment MS A gets a negative acknowledgement to the "speech" request or does not get an acknowledgement at all. For example, the called terminal or the intermediate network does not support the used signalling mechanism, e.g. the UUS. The calling user equipment MS A may then initiate a modification to UDI/RDI Multimedia (between itself and the serving network). A multimedia call would then result between the two user equipment.

It is also possible to invoke UUS service 2 in SETUP Initial Address Message (IAM) and use the UUS service 2 to convey the indication and the acknowledgement messages in between ALERTING(ACM) and CONNECT(ANM) in a USER INFORMATION(USR) message (this is a User-to-user information message). In this case the called user equipment MS B may respond to the setup message with a "UDI/RDI first" (i.e. UDI/RDI Multimedia BCIE and a Speech BCIE in this order) and initiate a modification to speech (between itself and the serving network) later, e g immediately after the SETUP.

As shown by FIG. 4a, it is also possible to invoke a UUS service 3 in order to communicate indications between the two user equipment. With the UUS service 3 a swap from the UDI mode to speech mode would happen as a first thing during the active phase of the call. That is, even though the call is setup in a multimedia mode it is immediately changed into speech mode, and then later on, if required, changed "back" to the multimedia mode.

The UUS service 3 may be invoked in SETUP(IAM) or, as shown by FIG. 4a, after the active call phase is reached using the so called Facility Request Message and Facility Accepted Message (FAR and FAA) of the ISUP. The indication of the mode and possible acknowledgements may then be conveyed with a USER INFORMATION(USR) message in the beginning of the active call state.

Instead of the UUS mechanisms it is possible to use an Application Transport Mechanism (APM) with an appropriate APM user application. The APM is a standard ISUP signalling mechanism, and is thus not described in any greater detail herein.

The network apparatus such as a MSC (or MSS) may convert the BCIEs from the calling party MS A for the ISUP/BICC and forward them towards the called party MS B. The ISUP Fallback facility, as defined e.g. in ITU-T Q.764, may be requested.

After the indication of the possibility for at least one further mode is successfully communicated between the two user equipment, the user equipment may change i.e. swap between these modes. The following will describe possible procedures for a swap from speech to a Multimedia or vice versa during a call.

As shown by FIGS. 4b and 5, a user may activate his/her user equipment MS A to send a "swap to multimedia" (or "swap to speech") indication. The indication is preferably transparent to the intermediate network apparatus 1 to 3 and is meant only for the other party of the connection (MS B). As above, the User-to-User Service (UUS) may be used for the signalling.

The indication can be e.g. a text message or command, a flag and so on. A UUS service 3 may have been invoked already in the SETUP(IAM), or during the active call phase with a FACILITY(FAR & FAA) message. After invocation UUS service 3 can be used in an active phase of a call to convey the swap indications and acknowledgements e.g. by a USER INFORMATION(USR) message. As above, an alternative to the use of the UUS mechanism is to use APM mechanism with a suitable APM user application.

The called user equipment MS B receives the "swap to multimedia/speech" indication and, consequently, initiates a modification from Speech mode to UDI/RDI Multimedia mode or from Multimedia mode to Speech mode. The modification is initiated by the user equipment and may only concern the leg between the user equipment MS B and an element of the serving network, such as the serving exchange 2. The user equipment MS B may also acknowledge the "swap to multimedia/speech" indication to the user equipment MS A using e.g. the above mentioned UUS or the user information message.

The user equipment MS A receives the acknowledgement and, consequently, initiates a modification from speech to UDI/RDI Multimedia or multimedia to speech between itself and the serving network.

Thus the connection at both end legs is modified at the initiative of the respective user equipment MS A and MS B. As mentioned above, the connection in the intermediate network may all the time use a UDI/RDI transmission without compression to make a possible later swap to UDI/RDI Multimedia easier. However, it shall be appreciated that this is not a necessity, and that the intermediate leg may also be modified in some applications.

If the user equipment MS A gets a negative acknowledgement to the "swap" request or does not get an acknowledgement at all (i.e. MS B or the intermediate network does not support the used signalling mechanism, e.g. the UUS), the user equipment MS A stays in the current mode.

If the UUS is to be used, a user equipment such as a mobile station and/or an ISDN terminal shall support the swap feature by being capable of generating and recognising UUS "swap" messages.

Figure 6:
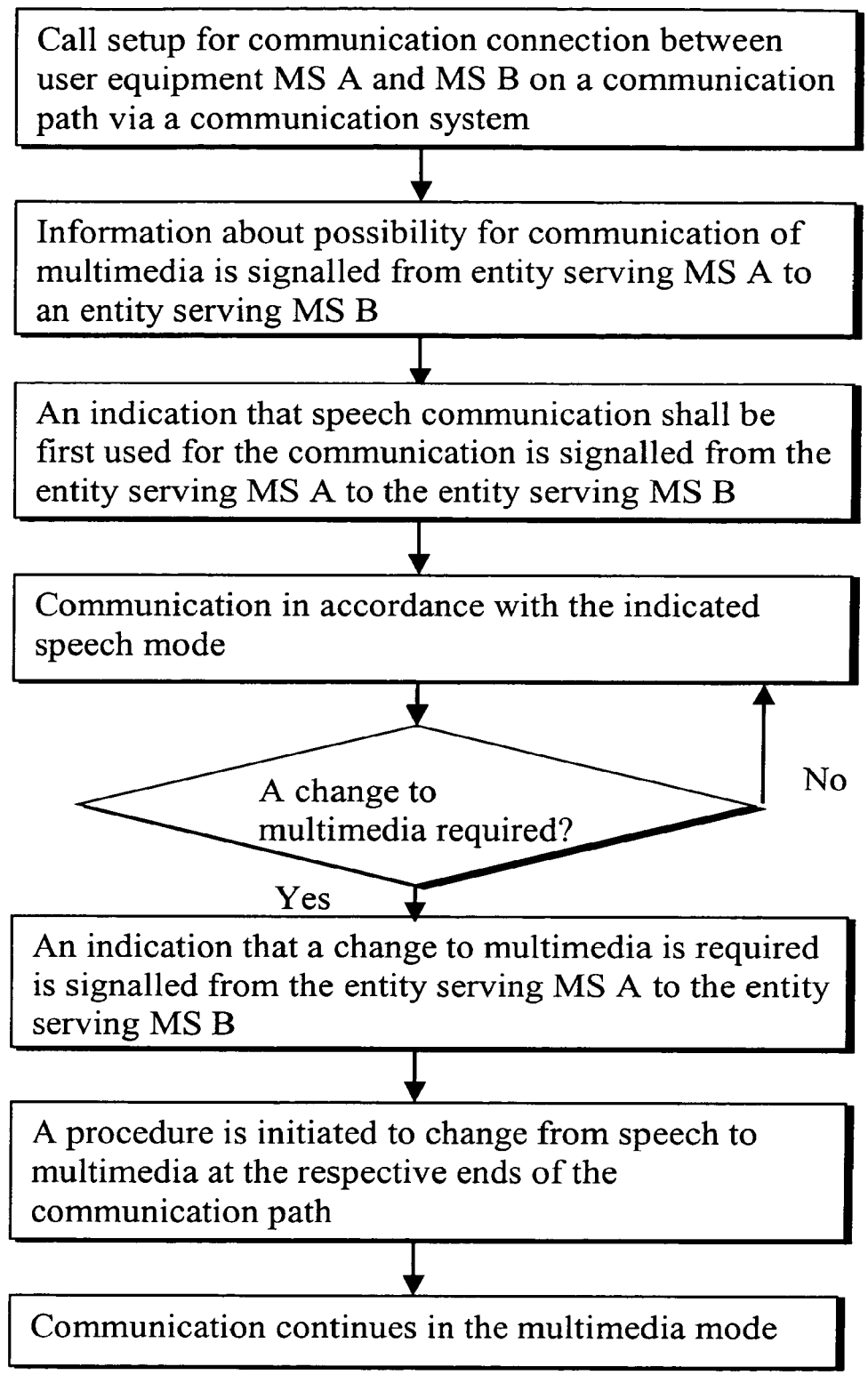
FIG. 6 is a flowchart illustrating operation in accordance with another embodiment.

According to an alternative to the above described solution wherein signalling was carried between the user equipment, it is possible to provide a network oriented solution for the swapping between the different modes. This will be described below with reference to the flowchart of FIG. 6.

When a calling user equipment MS A wants the call to start with speech, but reserves the possibility to swap to UDI/RDI Video/Multimedia later during the call, it may send two BCIEs (Speech BCIE and UDI/RDI Multimedia BCIE in this order) in the SETUP message.

A controller entity 1 such as the MSC Mobile services Switching Centre or a MSC Server (MSS) may then convert the BCIEs for ISUP/BICC and forward these to another network element, and more particularly towards to a corresponding network element 2 serving the called user equipment MS B.

The controller entity serving the MS A sends also a "speech" indication which is transparent to the intermediate network apparatus and is meant for the corresponding network element 2 serving the called user equipment MS B. For example, the User-to-User Service (UUS) can be used for this purpose, but such that the message is not sent by the actual user and to another user but between the two serving network elements 1 and 2. An alternative to the UUS mechanism is the APM mechanism with a suitable APM user application.

The network element 2 serving the called user equipment MS B receives the SETUP (IAM) with the UDI/RDI request. The network element 2 receives also a "speech first" indication. The serving network element 2 may consequently forward the SETUP (IAM) with two BCIEs, i.e. Speech and Multimedia and in this order, towards the called user equipment MS B for setup of the call in the speech mode. The BCIEs may need to be converted from ISDN to 3GPP format.

The called user equipment MS B may respond to the SETUP with two BCIEs, Speech and Multimedia in this order, to start with speech. The network element 2 serving the called party MS B acknowledges the "speech" indication to the network element 1 serving the calling party user equipment MS A. The above discussed UUS may be used also for this purpose.

The call is then set up as a speech call. However, the connection in the intermediate network may use a UDI/RDI transmission without compression to make a possible later swap to UDI/RDI Multimedia easier.

If the network element 1 serving the calling user equipment MS A gets a negative acknowledgement to the "speech" request or does not get an acknowledgement at all, the network element 1 may initiate a modification to UDI/RDI Multimedia (between itself and MS A).

When a user of either the calling or the called user equipment wants to swap from Speech to Multimedia or vice versa during the call, the user may initiate the swapping procedure at his/her equipment. E.g. an In-Call Modification procedure may be used in here, this being an existing 3GPP feature.

In accordance with an embodiment a network element (e.g. 1) serving a user equipment (e.g. MS A) initiates the In-Call Modification and thus starts the modification procedure between itself and the user equipment. The network element may then send a "swap to multimedia" (or "swap to speech") indication which is transparent to the intermediate network and is meant for a network element (e.g. 2) that serves another user equipment (e.g. MS B). As above, this may be accomplished by means of a UUS (User-to-User Service) or APM mechanism with a suitable APM user application.

When said other network element serving the other user equipment receives the "swap to multimedia" (or "swap to speech") indication, it may consequently initiate a modification from Speech to UDI/RDI Multimedia or vice versa on the leg between itself and said other user equipment.

The network element serving the other user equipment (e.g. MS B) may acknowledge the "swap" request to the network element serving the requesting user equipment. The In-Call Modification procedure is then finished at this user equipment (e.g. MS A). The connection at both end legs is then modified.

As above, the connection in the intermediate network may not need any modification as it may have been set up to use a UDI/RDI transmission all the time without compression to make a possible later swap to UDI/RDI Multimedia easier.

If e.g. a network element 1 serving a user equipment MS A gets a negative acknowledgement to the "swap" request or does not get an acknowledgement at all, the network element 1 serving the user equipment MS A may reject the In-Call Modification and the connection stays in its current mode.

According to a possibility the controller entity 1 serving the user equipment MS A communicated with the called user equipment MS B instead of the network element 2 serving the called user equipment MS B. This may be needed e.g. in a so called "mobile-to-ISDN-terminal" case.

Figure 7:
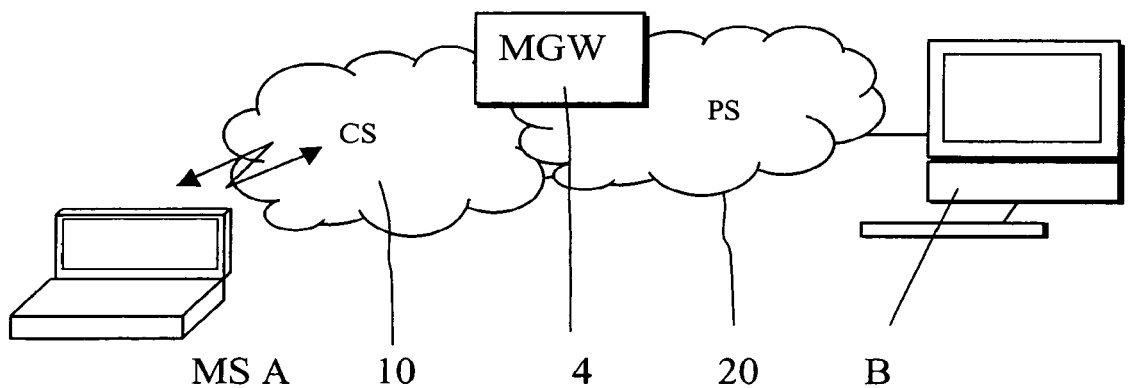
FIG. 7 shows a further embodiment.

Signalling between a user equipment and a network element may also be required e.g. in instances wherein one party of a call is served by a packet switched (PS) network while another party B is served by a circuit switched (CS) network, see FIG. 7. In FIG. 7 signalling of the required indicators occurs between an interworking network element 4 and a user equipment MS A (or the network element serving the user equipment) in communication via a circuit switched environment 10. The other party of the call is connected to a packet switched communication environment 20, for example to one operating in accordance with the Internet Protocol (IP) or Session Initiation Protocol (SIP).

It is noted that the above disclosed solution is applicable also in a case wherein more than two user equipment are involved in the call, for example in the case of a conference call. User terminals and the conference bridge may swap in a similar manner between operating modes. It is also possible that some of the connections are in the speech mode and some in video/multimedia mode.

It should be appreciated that while embodiments have been described in relation to user equipment such as mobile stations, other embodiments are applicable to any other suitable type of user equipment.

This embodiment has been described in the context of GSM based systems. This invention is also applicable to any other communication systems.

It shall also be appreciated that the principles described with reference to FIGS. 2 to 5 can also be used for provision of other control features. Thus any control instructions may be signalled via a link between a first user equipment and a second user equipment via a communications network where after in at least one of the user equipment may initiate a procedure for provision of control operations in accordance with said instructions. The initiation may occur e.g. such that said user equipment sends a control procedure activation signal to the network.

It is also noted herein that while the above describes exemplifying embodiments of the invention, there are several variations and modifications which may be made to the disclosed solution without departing from the scope of the disclosure as defined in the appended claims.

What is claimed is:

1. A method for setting up a communication link comprising a first communication leg between a first user equipment and a communication network and a second communication leg between a second user equipment and the communication network, the method comprising:

signalling, by the first user equipment, information regarding a plurality of modes supported by the first user equipment to the second user equipment via the communication network; and receiving and displaying, by the first user equipment, an indicator indicating at least one of a plurality of modes supported by the second user equipment, the first user equipment and the second user equipment having at least two supported modes in common;

initiating, in the first user equipment, establishment of the communication link using at least one of a mode preferred by a user of the first user equipment and said indicator indicating the at least one mode supported by the second user equipment in the beginning of the communication link, changing, at the first user equipment, to another mode of the at least two modes supported by the first user equipment and the second user equipment in response to an activation from either of the first user equipment and the second user equipment during the initiated communication, wherein the first user equipment communicates with the second user equipment via a corresponding one of the first communication leg and the second communication leg, each comprising a respective wireless interface.

2. The method according to claim 1, wherein the communication link is established for a call.

3. The method according to claim 1, wherein the modes are related to a call communication.

4. The method according to claim 1, wherein the modes comprise at least speech call and video call.

5. An apparatus for setting up a communication link comprising a first communication leg between the apparatus and a communication network and a second communication leg between a user equipment and the communication network, apparatus comprising:

at least one processor; and
at least one memory including computer program code, where the at least one memory and the computer program code are configured, with the at least one processor, to cause the apparatus to at least:
  signal information regarding a plurality of modes supported by the apparatus to the user equipment via the communication network;
  receive and display an indicator indicating at least one of a plurality of modes supported by the user equipment, the apparatus and the user equipment having at least two supported modes in common;
  initiate establishment of the communication link using at least one of a mode preferred by a user of the apparatus and said indicator indicating the at least one mode supported by the user equipment in the beginning of the communication link; and
  change to another mode of the at least two modes supported by the apparatus and the user equipment in response to an activation from either of the apparatus and the user equipment during the initiated communication,
wherein the apparatus communicates with the user equipment via a corresponding one of the first communication leg and the second communication leg, each comprising a respective wireless interface.

6. The apparatus according to claim 5, wherein the communication link is established for a call.

7. The apparatus according to claim 5, wherein the modes are related to a call communication.

8. The apparatus according to claim 5, wherein the modes comprise at least speech call and video call.

\* \* \* \* \*